United States Patent [19]

Kohno et al.

[11] Patent Number: 5,030,083
[45] Date of Patent: Jul. 9, 1991

[54] APPARATUS FOR MANUFACTURING A HOLLOW SYNTHETIC RESIN PRODUCT

[75] Inventors: Yoshikatsu Kohno, Kanzaki; Yoshio Kawaguchi, Amagasaki, both of Japan

[73] Assignee: Tigers Polymer Corporation, Osaka, Japan

[21] Appl. No.: 458,192

[22] Filed: Dec. 28, 1989

[51] Int. Cl.⁵ .............................................. B29C 49/04
[52] U.S. Cl. .................................. 425/532; 264/540; 425/534; 901/17
[58] Field of Search ................. 264/531, 540; 425/522, 425/532, 534; 901/7, 17

[56] References Cited

U.S. PATENT DOCUMENTS

| 4,628,974 | 12/1986 | Meyer | 901/17 |
| 4,657,466 | 4/1987 | Leeper et al. | 901/7 |

FOREIGN PATENT DOCUMENTS 54-15580  6/1979  Japan .
58-6678   2/1983  Japan .
58-29214  6/1983  Japan .
63-30129  2/1988  Japan .

OTHER PUBLICATIONS

Gosei Jushi Shimbun (Synthetic Resin News) the Mar. 21, 1988 issue.

Primary Examiner—Timothy Heitbrink
Attorney, Agent, or Firm—Armstrong, Nikaido, Marmelstein, Kubovcik & Murray

[57] ABSTRACT

A hollow synthetic resin product manufacturing apparatus with an extruder having an extruding head for extruding a parison and a mold formed of lower and upper molding portions respectively having grooves, a cutter for cutting the parison extruded from the extruding head into a specified length, a robot having a hand for holding the parison at one point of the parison, and a control unit for moving the hand holding the above portion of the parison so that the parison be accommodated in the groove of the lower molding portion.

15 Claims, 10 Drawing Sheets

APPARATUS FOR MANUFACTURING A HOLLOW SYNTHETIC RESIN PRODUCT

BACKGROUND OF THE INVENTION (1) Field of the Invention

This invention relates to an apparatus and a method for manufacturing a hollow synthetic resin product by inflating a parison extruded from an extruding head of an extruder in a mold, especially to an apparatus and a method optimum for manufacturing a tube-shaped synthetic resin product which is bent two- or three-dimensionally.

(2) Description of the Prior Art

Figure 1:
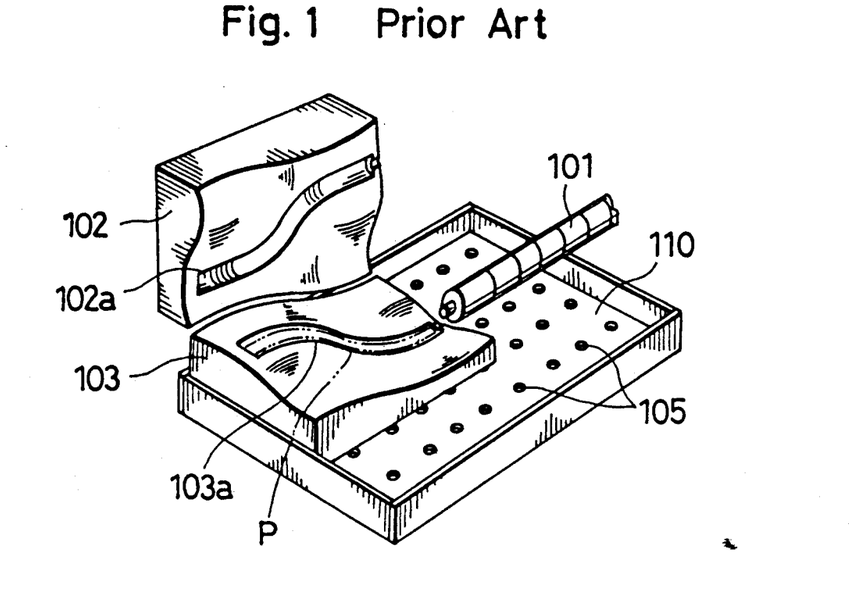
FIG. 1 is a perspective view of a prior art invention.
Figure 2:
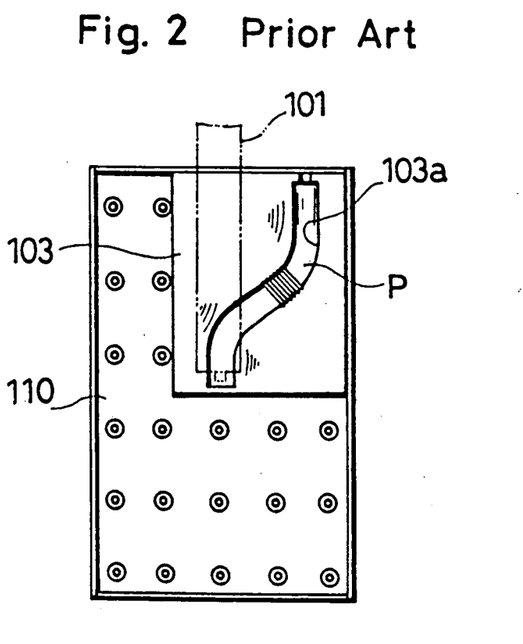
FIGS. 2 and 3 explain how to operate the same.
Figure 3:
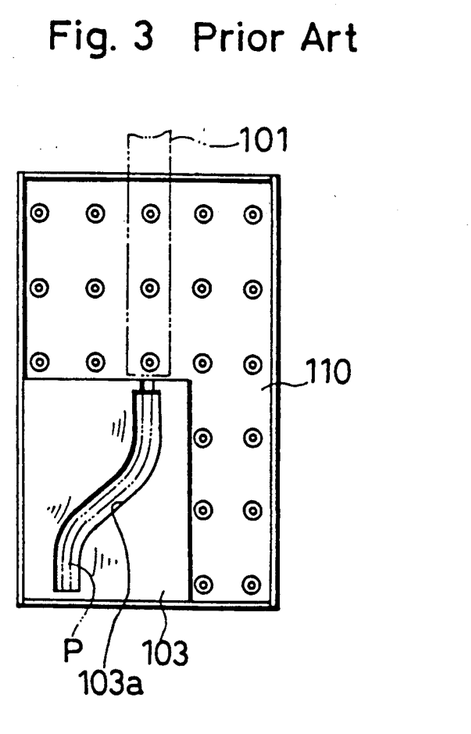

A hollow synthetic resin product shown in FIGS. 1 through 3 has been disclosed in Japanese Patent Publication No. 54-15580.

As shown in FIG. 1, an extruding head 101 for extruding a parison P formed of a synthetic resin is provided at a fixed position against a base plate 110.

A mold comprises upper and lower molding portions 102 and 103. The lower molding portion 103 is provided on free bearings 105 arranged on the base plate 110, thereby moving horizontally on the free bearings 105 mechanically and/or electrically, or manually.

The lower molding portion 103 has a groove 103a, which is bent three-dimensionally, for accommodating the parison P extruded from the extruding head 101. The upper molding portion 102 has a groove 102a, which is to be opposed to the groove 103a when the upper and lower molding portions 102 and 103 are put together.

A hollow synthetic resin product manufacturing apparatus having the above construction is operated in the following manner.

As shown in FIG. 2, the lower molding portion 103 is moved to a position where an end of the groove 103a is substantially right below an end of the extruding head 101. While the parison P is extruded from the extruding head 101, the lower molding portion 103 is further moved in such a manner that the above end of the extruding head 101 follows the groove 103a, whereby the parison P is accommodated in the groove 103a.

The lower molding portion 103 is stopped when the other end of the groove 103a reaches substantially right below the above end of the extruding head 101. Then, the upper molding portion 102 is put on the lower molding portion 103, thereafter the parison P is inflated by compressed air. In this manner, a hollow synthetic resin product bent three-dimensionally such as a plastic tube is produced.

Another construction has also proposed, in which a lower molding portion is fixed and an extruding head is moved along a groove on the lower molding portion, whereby a parison P extruded from the extruding head is accommodated in the groove.

In the above conventional apparatuses, at least either of the extruding head or the lower molding portion should be moved. However, the extruding head and the lower molding portion are usually comparatively heavy and large, which makes a device for moving them inevitably complicated and large-scale. Accordingly, a hollow synthetic resin product manufacturing apparatus having the above constructions can hardly be simple and compact.

Moreover, the above-mentioned device for moving the extruding head or the molding portion is integrated therewith. Therefore, if the moving device is out of order, the whole apparatus cannot be operated until the device is repaired. This inconvenience lowers the rate of operation of the manufacturing apparatus.

SUMMARY OF THE INVENTION

Accordingly, the present invention has an object of offering a hollow synthetic resin product manufacturing apparatus which is simple and compact, and further improves its rate of operation.

The above object is fulfilled by an apparatus for manufacturing a hollow synthetic resin product by accommodating a parison extruded from an extruding head of an extruder into a groove of a lower molding portion, which forms a mold together with an upper molding portion, and then inserting gas for inflating the parison with the lower and upper molding portions being put together, the apparatus comprising a cutter for cutting a parison extruded from an extruding head into a specified length; a robot having a hand for holding the parison at one point thereof; and control means for moving the hand along a groove of a lower molding portion in such a manner that the parison held by the hand be accommodated in the groove.

In the above construction, the parison extruded from the extruding head is cut by the cutter, and the parison is moved with one point thereof held by the hand of the robot controlled by the control means, whereby the parison is accommodated in the groove on the lower molding portion. This construction does not require a large and complicated mechanism for moving the extruding head and the lower molding portion. In consequence, a hollow synthetic resin product manufacturing apparatus which is simple and compact is realized.

Furthermore, the robot may not be integrated with the extruding head or the lower molding portion. Therefore, even if the robot is out of order, the manufacturing apparatus keeps operated only through robot replacement while the robot out of order is repaired, thus improving the rate of operability of the apparatus.

The robot may be an articulated robot having a multiplicity of rotating mechanisms.

The robot may be a polar coordinates robot having a multiplicity of rotating mechanisms and a sliding mechanism.

The robot may be a cylindrical coordinates robot having a rotating mechanism and a multiplicity of sliding mechanisms.

The robot may be a rectangular coordinates robot having a multiplicity of sliding mechanisms.

The point held by the hand may be an end of the parison.

The hand may be controlled to hold an upper end of the parison and the lower molding portion may be provided in such a place that an end of the groove is substantially right below the extruding head.

If the apparatus is added with either of the above two constructions, the capacity of the apparatus and the size precision of the hollow synthetic resin product are easily enhanced without employing any more robot.

The above apparatus may further comprise another robot having a hand for holding the parison at another point.

The hands of the robots may be controlled to respectively hold both ends of the parison.

In the above construction, points of the parison such as both ends are accurately positioned when accommodating the parison in the groove, whereby improving the size precision of the products.

The robot may be controlled to operate the hand to rotate a parison portion held by the hand around a twisting axis of the parison.

In this construction, the parison is prevented from twisting or is twisted on purpose.

The above apparatus may further comprise at least one mold having an upper molding portion and a lower molding portion, wherein the lower molding portions may be alternately positioned below the extruding head.

The lower molding portions may be provided on a dividing table and each controlled to be alternately positioned below the extruding head.

In the above construction, while gas is injected into one mold, another mold accommodates another piece of parison, whereby improving the capacity of the apparatus.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF A PREFERRED EMBODIMENT

An embodiment of the present invention will be described referring to FIGS. 4 through 13.

Figure 4:
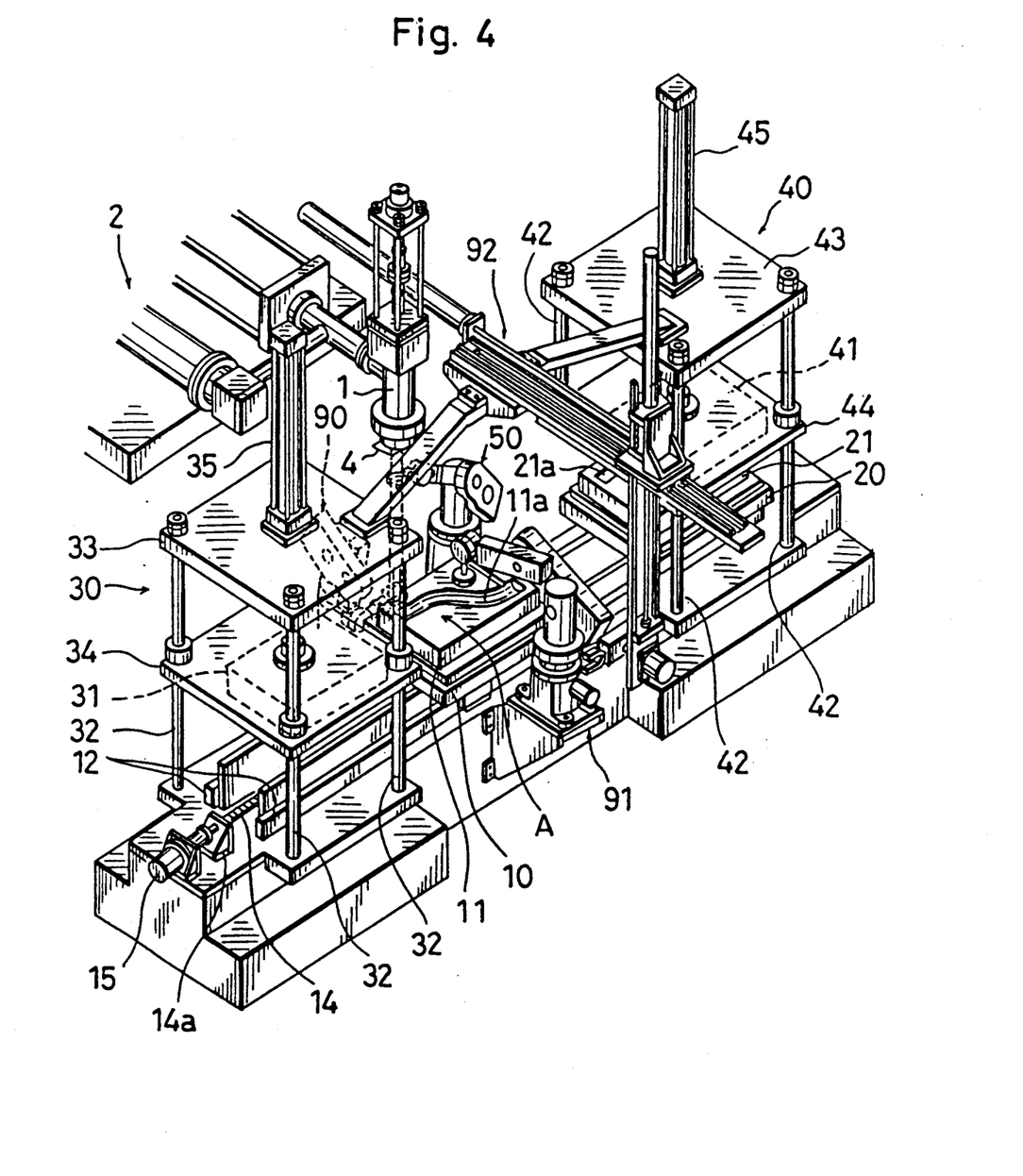
FIG. 4 is a perspective view of an embodiment of this invention.
Figure 5:
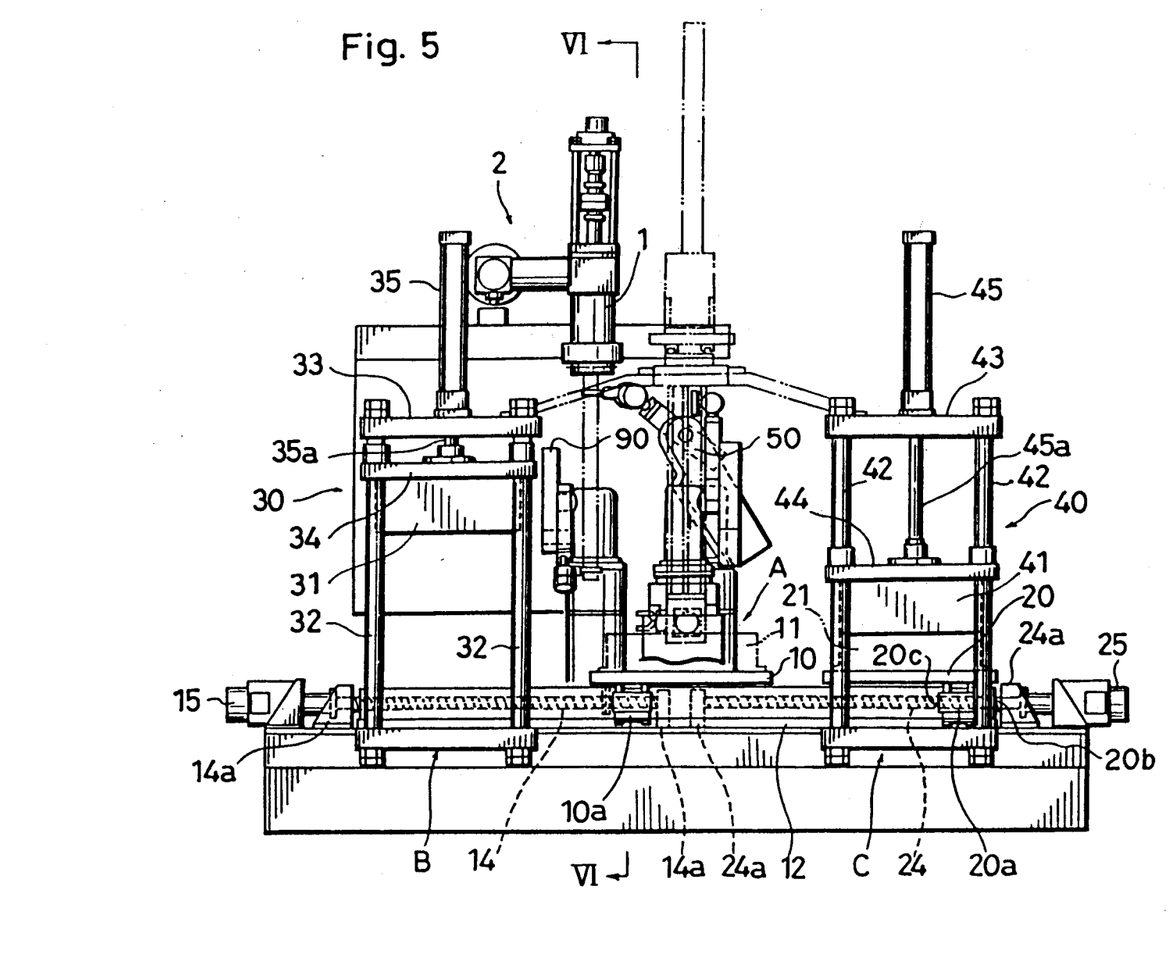
FIG. 5 is a front view of the same.

As shown in FIGS. 4 and 5, a hollow synthetic resin product manufacturing apparatus is equipped with an extruder 2 for extruding a specified length of parison P, the extruder having an extruding head 1 fixed on a tip thereof and the parison P being formed by melting a synthetic resin.

Figure 6:
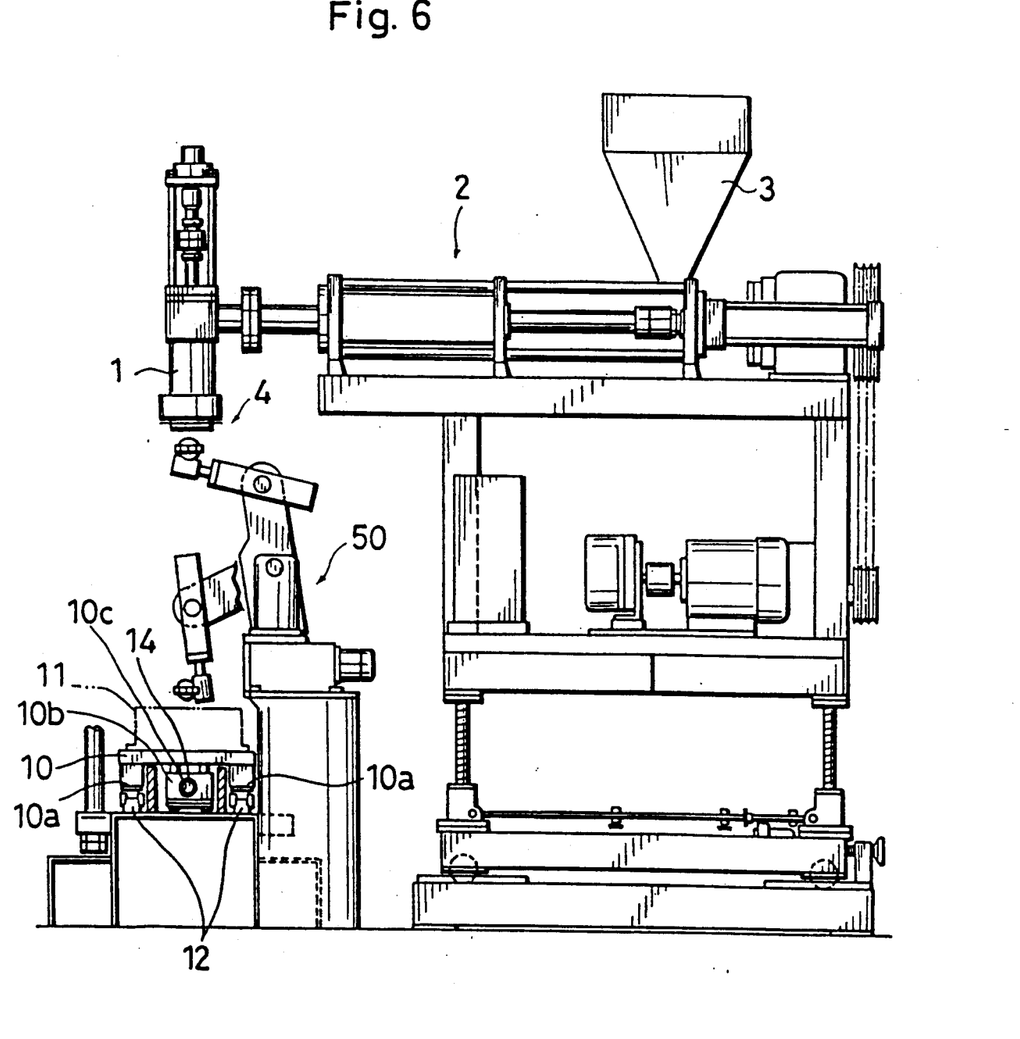
FIG. 6 is a cross sectional view taken along the line VI—VI of FIG. 5.

As shown in FIG. 6, the extruder 2 is also equipped with a hopper 3 into which the synthetic resin is put, a temperature adjuster (not shown) for melting the synthetic resin and keeping it at a specified temperature, and a measuring device for measuring the length of the parison P to be extruded. The length to be extruded is determined based on a length of a groove 11a or 21a on a lower molding portion 11 or 21, the weight of the synthetic resin product to manufacture, and so on.

The extruding head 1 is fixed with its extruding tip downward, and a cylindrical thickness adjuster (not shown) for hollowing the parison P and adjusting its thickness is included in and concentrically with the extruding head 1.

Figure 7:
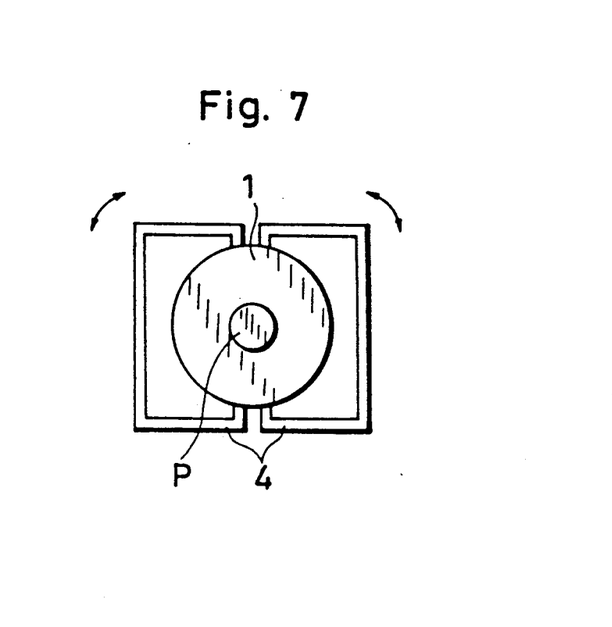
FIG. 7 is a bottom view of a pair of cutters and their neighborhood of the above embodiment.

As FIG. 7 illustrates, the extruding head 1 also has a pair of cutters 4 at its extruding tip for cutting the parison P extruded from the extruding head 1 into a specified length. The cutters 4 work by rotating while interposing the parison P therebetween.

Although the extruder 2 is usually of accumulator-type, other types can also be used.

Molding devices 30 and 40 are provided to both sides of the extruding head 1. The molding device 30 has two pairs of supporting rods 32 standing opposed with a pair of rails 12 therebetween. The supporting rods 32 are extended through a rectangular plate 34 at four corners thereof, whereby the plate 34 is vertically movable. Upper ends of the supporting rods 32 are bolted on a top plate 33 at four corners thereof, the top plate 33 having substantially the same size with the plate 34.

A hydraulic cylinder 35 stands on the top plate 33, its cylinder rod 35a being extended through the top plate 33 and being attached on an upper surface of the plate 34. In this construction, the plate 34 is vertically movable by the hydraulic cylinder 35 while being guided by the supporting rods 32.

Another molding device 40 has two pairs of supporting rods 42 standing opposed with the rails 12 therebetween. The supporting rods 42 are extended through a rectangular plate 44 at four corners thereof, whereby the plate 44 is vertically movable. Upper ends of the supporting rods 42 are bolted on a top plate 43 at four corners thereof, the top plate 43 having substantially the same size with the plate 44.

A hydraulic cylinder 45 stands on the top plate 43, its cylinder rod 45a being extended through the top plate 43 and being attached on an upper surface of the plate 44. In this construction, the plate 44 is vertically movable by the hydraulic cylinder 45 while being guided by the supporting rods 42.

The molding devices 30 and 40 have respectively nozzle inserting devices (not shown and will be described later) on backs thereof. The pair of rails 12 are extended from the molding device 30 to another molding device 40. The rails 12 have carriages 10 and 20 thereon.

The carriage 10, having a roller bearing 10a, is movable between a parison accommodating position A below the extruding head 1 and the molding device 30. Attached below the carriage 10 is an engaging member 10b having a female thread 10c.

The carriage 20, having a roller bearing 20a, is movable between a parison accommodating position A below the extruding head 1 and the molding device 40. Attached below the carriage 20 is an engaging member 20b having a female thread 20c.

Between the parison accommodating position A and the molding device 30 is a male-threaded shaft 14. The male-threaded shaft 14 is rotatably supported at both ends thereof by a supporting member 14a. The shaft 14 is screwed into the female thread 10c of the carriage 10, whereby moving the carriage 10 when driven by a driving motor 15.

Between the parison accommodating position A and the molding device 40 is a male-threaded shaft 24. The male-threaded shaft 24 is rotatably supported at both ends thereof by a supporting member 24a. The shaft 24 is screwed into the female thread 20c of the carriage 20, whereby moving the carriage 20 when driven by a driving motor 25.

Loaded on the carriage 10 is the lower molding portion 11 having the groove 11a for accommodating the parison P which has been extruded from the extruding head 1. The upper molding portion 31 for forming a mold together with the lower molding portion 11 is attached on a bottom surface of the plate 34. The upper molding portion 31 is lowered and put on the lower molding portion 11 when the lower molding portion 11 reaches a molding position B.

Loaded on the carriage 20 is the lower molding portion 21 having the groove 21a for accommodating the parison P which has been extruded from the extruding head 1. The upper molding portion 41 for forming a mold together with the lower molding portion 21 is attached on a bottom surface of the plate 44. The upper molding portion 41 is lowered and put on the lower molding portion 21 when the lower molding portion 21 reaches a molding position C.

An upper end holding robot 50 is provided behind and further to the right (FIG. 5) of the parison accommodating position A for holding an upper end of the parison P which has been extruded from the extruding head 1 and cut by the cutters 4. A lower end holding robot 90 is provided behind and further to the left (FIG. 5) of the parison accommodating position A for holding a lower end of the above parison P. Provided in front of the parison accommodating position A are a part insert robot 91 and an automatic product takeout device 92. The part insert robot 91 is for inserting parts to be attached to the parison P into the grooves 11a and 21a of the lower molding portions 11 and 21. The automatic product takeout device 92 is for taking out the hollow synthetic resin product from the lower molding portion 11 or 21.

Figure 8:
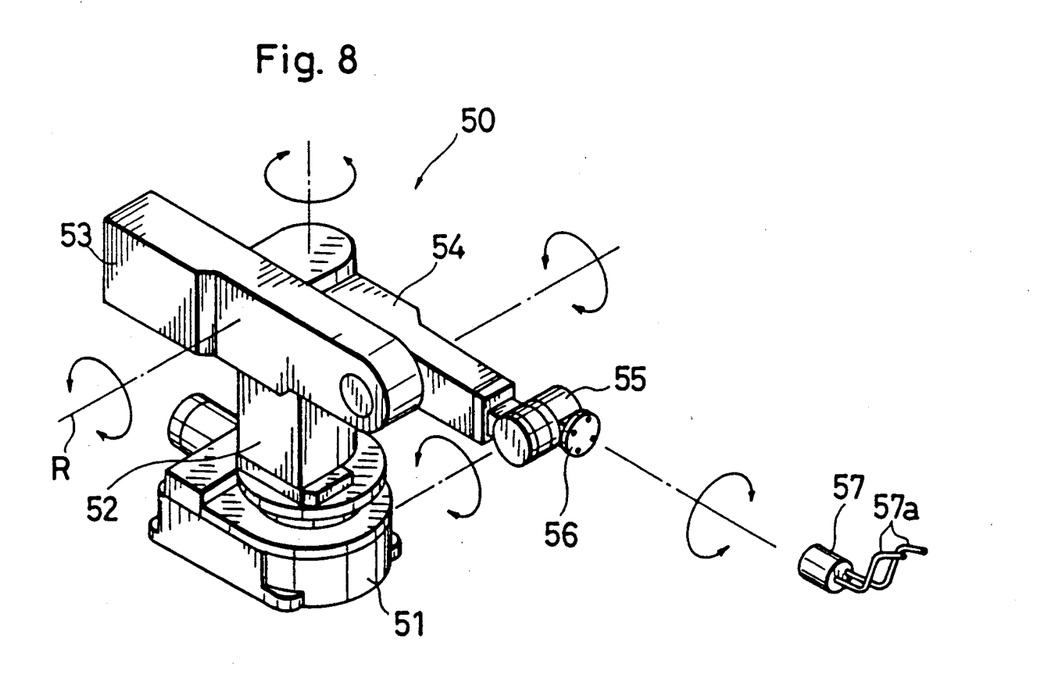
FIG. 8 is a perspective view of an upper end holding robot of the same.
Figure 9A:
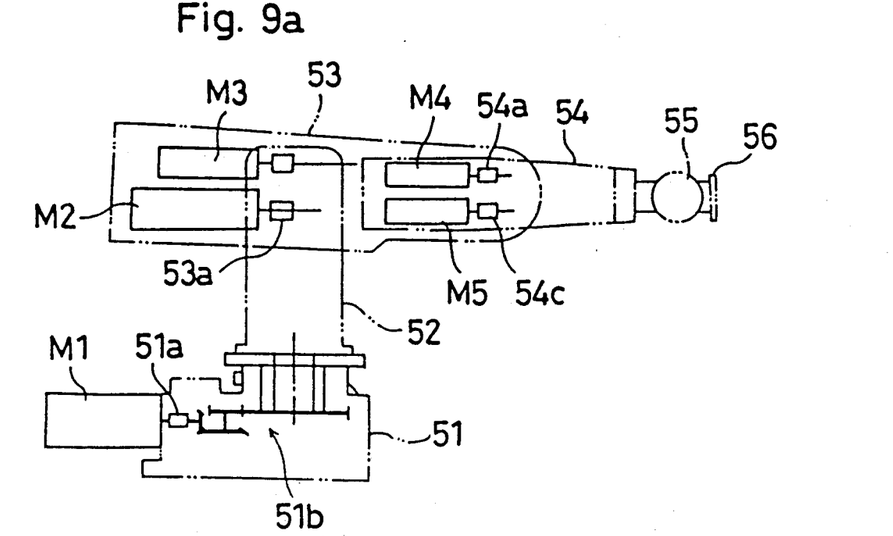
FIGS. 9a, 9b, 9c and 10 show how each member of the upper end holding robot is driven.
Figures 9B, 9C:
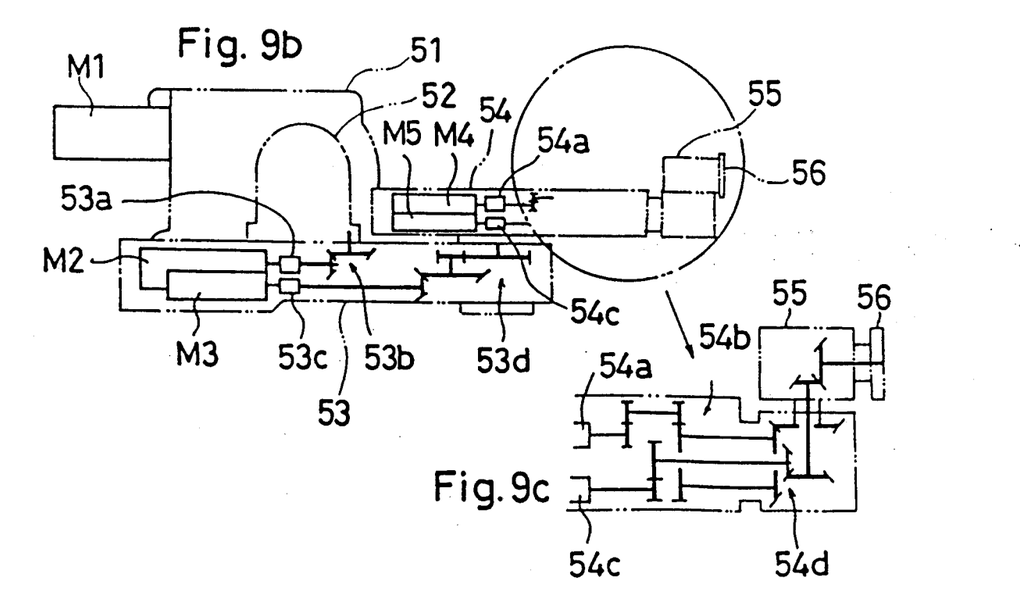
Figure 10:
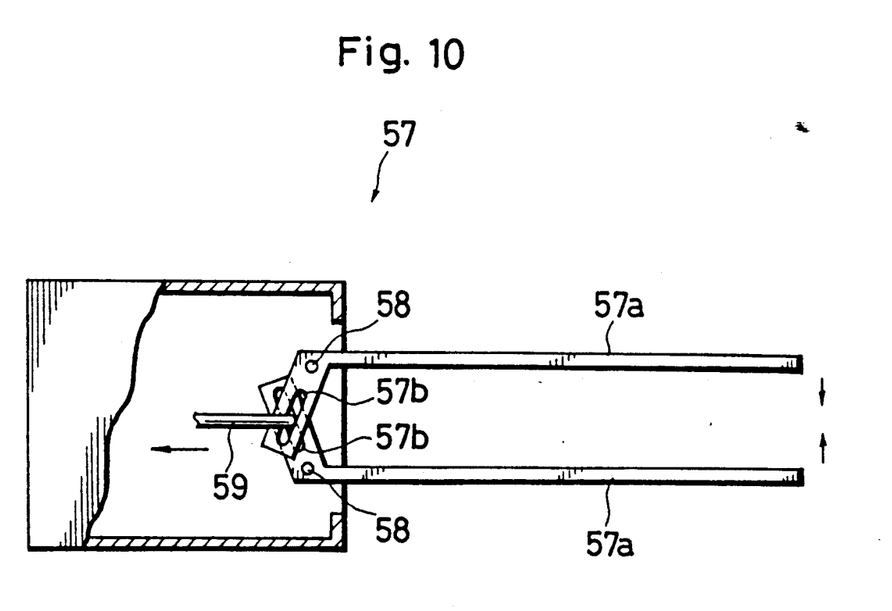

The upper end holding robot 50 has a construction shown in FIG. 8. A support 52 rotatably stands on a base 51. A shoulder 53 is supported on an upper side surface of the support 52 and is rotatable around a rotating axis R. An arm 54 is supported at an end of the shoulder 53 and is rotatable around an axis running in parallel with the rotating axis R of the shoulder 53. A wrist 55 is supported at a tip of the arm 54 and is rotatable around an axis running in parallel with the above rotating axis R.

A hand attaching member 56 is attached on a tip of the wrist 55 and is rotatable around a horizontal axis perpendicular to the rotating axis of the wrist 55. Attached removably on the hand attaching member 56 is a hand 57 having a pair of fingers 57a on an end surface thereof for holding the upper end of the parison P.

The upper end holding robot 50 has a construction shown in FIGS. 9a, 9b, 9c and 10 in which the following operation is executed. When a driving motor M1 included in the base 51 is rotated, that rotation is conveyed to a first gearing mechanism 51b through a coupling 51a, and the rotation of the gearing mechanism 51b drives the support 52 to rotate. When a driving motor M2 included in the shoulder 53 is rotated, that rotation is conveyed to a second gearing mechanism 53b through a coupling 53a, and the rotation of the gearing mechanism 53b drives the shoulder 53 to rotate. When a driving motor M3 also included in the shoulder 53 is rotated, that rotation is conveyed to a third gearing mechanism 53d through a coupling 53c, and the rotation of the gearing mechanism 53d drives the arm 54 to rotate.

The arm 54 includes two driving motors M4 and M5. The rotation of the driving motor M4 is conveyed to a fourth gearing mechanism 54b through a coupling 54a, and the rotation of the gearing mechanism 54b drives the wrist 55 to rotate. The rotation of the driving motor M5 is conveyed to a fifth gearing mechanism 54d through a coupling 54c, and the rotation of the gearing mechanism 54d drives the hand attaching member 56 to rotate.

The pair of fingers 57a (FIG. 10) are rotatably supported at middle portions thereof respectively by supporting shafts 58. An open/close driving force conveying rod 59 is inserted through both holes 57b made at roots of the fingers 57a. When the rod 59 is pulled in the direction of an arrow in FIG. 10 by a driving force (not shown), the fingers 57a are closed. On the other hand, when the rod 59 is pushed in the opposed direction to the above, the fingers 57a are opened.

The lower end holding robot 90 and the part insert robot 91 are constructed and operated in the same manner with the upper end holding robot 50.

Figure 11:
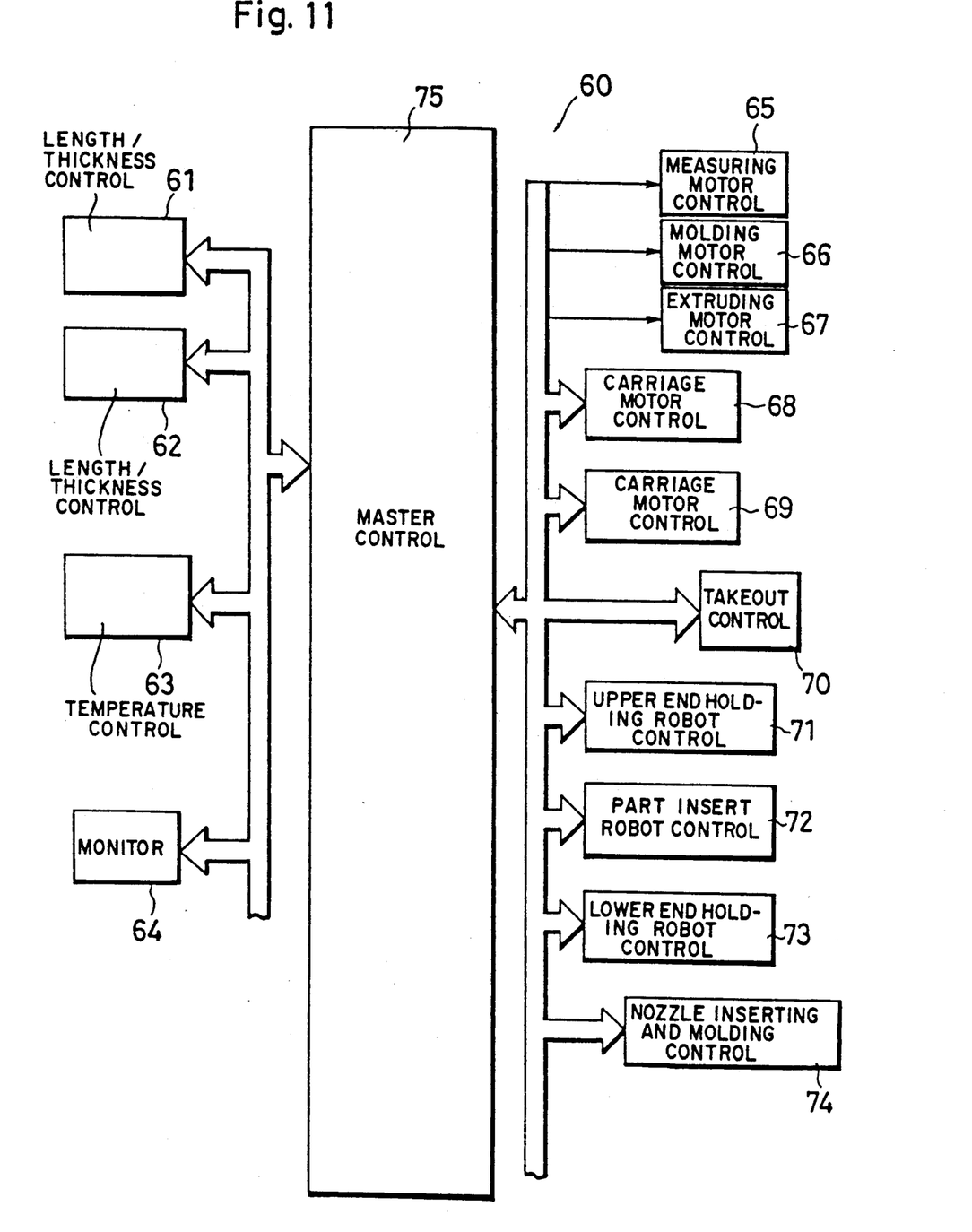
FIG. 11 is a block diagram of a control device of the above embodiment.

The operations of these robots 50, 90 and 91 are controlled by a control device 60 shown in FIG. 11. The control device 60 is equipped with two length/thickness controls 61 and 62, a temperature control 63, a monitor 64, a measuring motor control 65, a molding motor control 66, an extruding motor control 67, carriage motor controls 68 and 69, a product takeout control 70, an upper end holding robot control 71, a part insert robot control 72, a lower end holding robot control 73, a nozzle inserting and molding control 74, and a master control 75.

Each of the length/thickness controls 61 or 62 stores a length of the parison P to be extruded from the extruding head 1 and a thickness of the parison P pitch by pitch (the length of one pitch is predetermined) in the longitudinal direction, and also controls the cylindrical thickness adjuster (not shown) provided in the extruding head 1 in accordance with the data stored. The control 61 stores the data for the product to be molded in the lower molding portion 11, and the control 62 stores the data for the product molded in the lower molding portion 21. The temperature control 63 controls the temperature adjuster (not shown) provided in the extruder 2. The measuring motor control 65 controls the driving of a parison measuring motor provided in the extruder 2. The molding motor control 66 controls the driving of the hydraulic cylinders 35 and 45 of the molding devices 30 and 40. The extruding motor control 67 controls the driving of another hydraulic cylinder provided in the extruding head 1 for extruding the parison P. The carriage motors 68 and 69 respectively control the driving motors 15 and 25 for moving the carriages 10 and 20. The product takeout control 70 controls the driving of the automatic product takeout device 92. The upper end holding robot control 71, the lower end holding robot control 73 and the part insert robot control 72 respectively control the driving of upper end holding robot 50, the lower end holding robot 90 and the part insert robot 91. The nozzle inserting and molding control 74 controls the driving of the molding devices 30 and 40 having the nozzle inserting devices. The master control 75 receives operation start/finish signals from these controls and also sends them to these controls.

The controls 61, 62, 68, 69, 71, 72 and 73 respectively involve CPUs for storing the control data and executing their respective controls in accordance with the stored data. The above controls also respectively involve detecting sensors (not shown) for detecting if the operation is completely started or finished.

The CPU of the upper end holding robot control 71 has various data such as the followings preset: the operation timing of the motors M1 through M5, the locus of the hand 57 in the x-y-z coodinate system from the time the fingers 57a hold the parison P for the purpose of accommodating it in the groove of the lower molding portion until they go back to their original positions, the angle of the fingers 57a against the horizontal plane, and the opening/closing timing of the fingers 57a. The above locus is necessary for controlling the amount of operation.

The upper end holding robot control 71 controls the robot 50 to move in the predetermined manner when the operation start signal is input to the CPU from the master control 75. When the robot 50 finishes the predetermined operation, the control 71 detects that with its detecting sensor and sends the operation finish signal to the master control 75.

The other controls execute their respective controls in the same manner with the control 71 in accordance with the signals from the master control 75.

Figure 12:
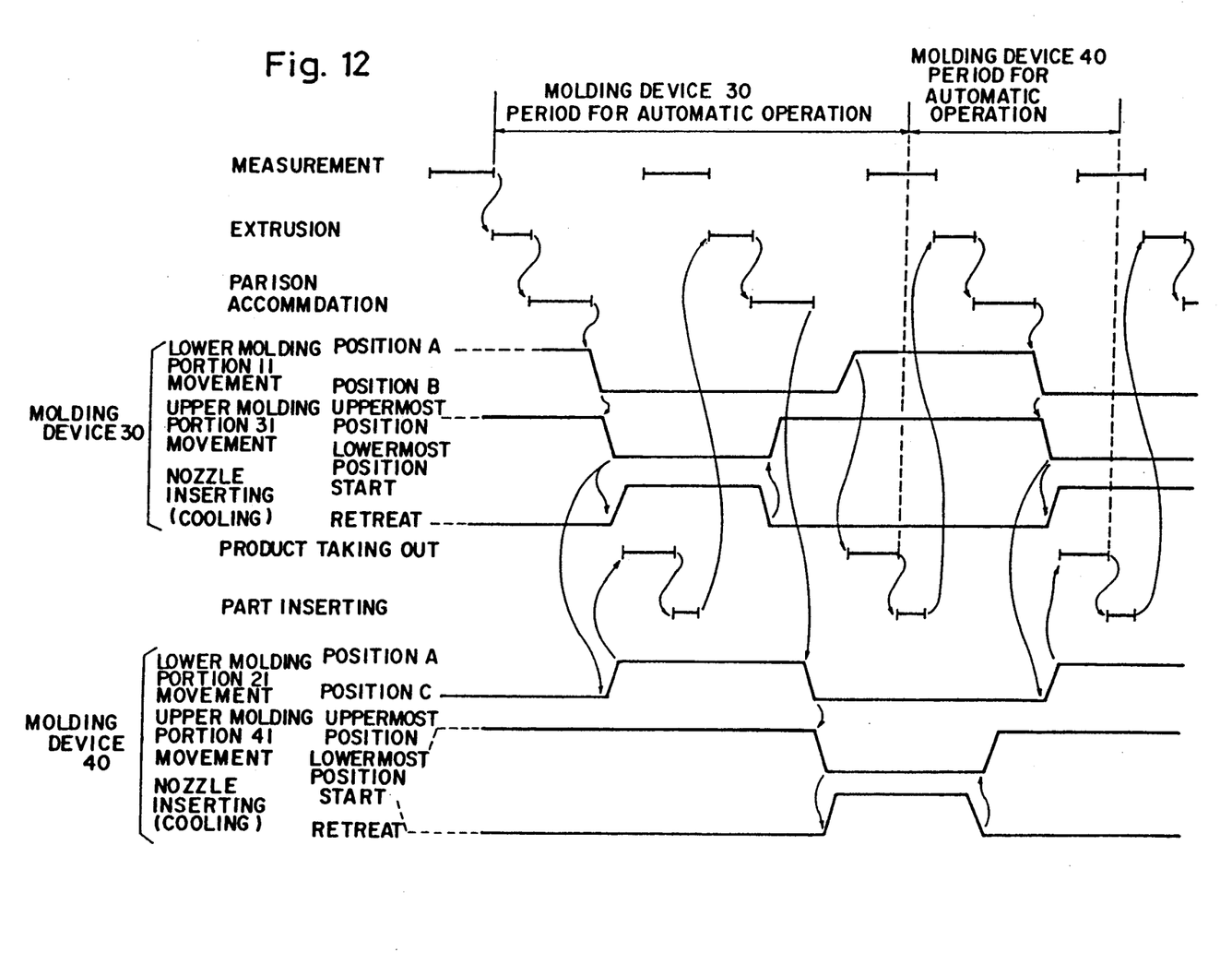
FIG. 12 is a timing chart of the operation of the same.

The hollow synthetic resin product manufacturing apparatus having the above construction according to this invention is operated in the following manner as shown in FIG. 12.

Figure 13A:
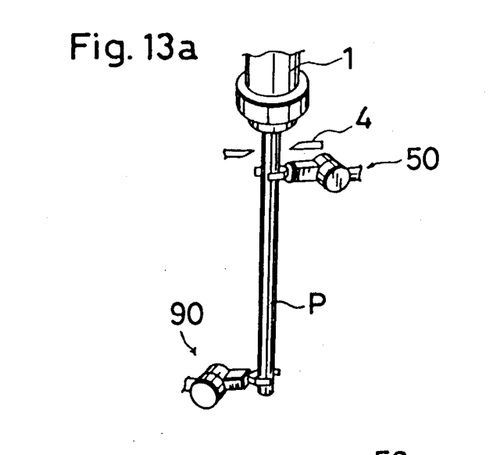
FIGS. 13a through 13d illustrate a procedure of manufacturing a hollow synthetic resin product by the above embodiment.
Figure 13B:
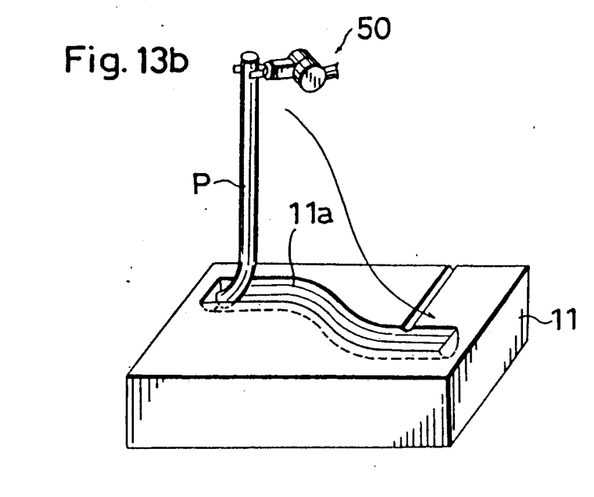
Figure 13C:
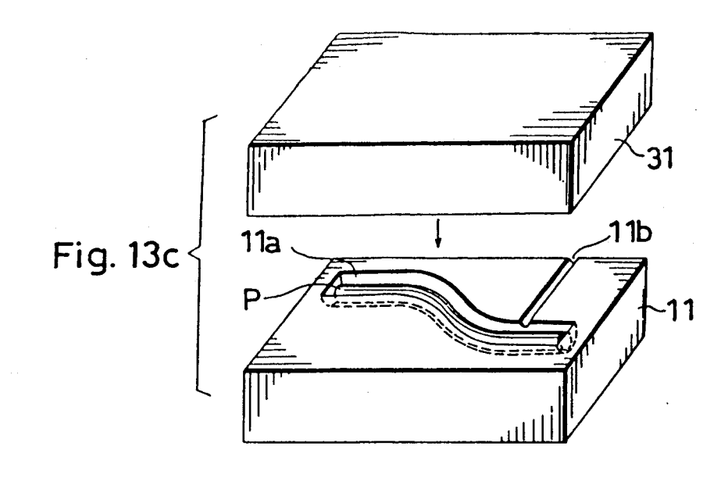
Figure 13D:
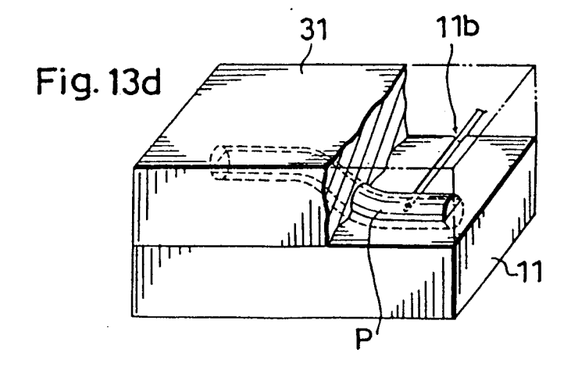

One of the carriages, the carriage 10 for example, is moved to the position A below the extruding head 1. At this time, the measuring device has already measured the length of the parison P and is waiting for another measuring. The waiting time is preset in the control 61. (If the carriage 20 is in operation, the waiting time is preset in the control 62.) When the carriage 10 is moved to the position A, the parison P is extruded from the extruding head 1. At this time, the upper end holding robot 50 and the lower end holding robot 90 respectively hold the upper and lower ends of the parison P, thereafter the unnecessary portion of the parison P is cut off by the cutters 4 (FIG. 13a). The robots 50 and 90 further move the parison P until the lower end of the parison P reaches an end of the groove 11a of the lower molding portion 11. Then, the robot 90 releases the parison P. The robot 50, still holding the parison P, guides it along the groove 11a, whereby the parison P is accommodated in the groove 11a. (FIG. 13b)

The accommodating operation is based on the locus of the fingers 57a. The coordinates x, y and z necessary for forming the preset locus are calculated in advance by predicting how the tips of the fingers 57a should move in order to accommodate the parison P in the groove 11a. The coordinate origin is, for example, the crossing point of the lower end line and the center axis of the base 51. The parison P is prevented from twisting by the following control of the hand 57: the fingers 57a are moved on a horizontal plane and/or rotated around the rotating axis of the hand attaching member 56 moment by moment so that the tips of the fingers 57a are directed exactly toward a groove 11a portion in which the parison P is to be put in the next moment.

When the parison P is completely accommodated in the groove 11a (FIG. 13c), the carriage 10 is moved into the molding device 30 and the upper molding portion 31 is lowered on the lower molding portion 11. After that, the nozzle is inserted by the nozzle inserting device (not shown) into the parison P through a nozzle inserting hole 11b in the mold (FIG. 13d), whereby gas such as compressed air is blown into the parison P through a hole at a tip of the nozzle inserting device. When the carriage 10 leaves the position A, the other carriage 20 is moved to the position A, and the next piece of parison P is extruded, held at both ends thereof and cut off in the same manner as above. After that, the parison P is accommodated in the groove 21a, the upper molding portion 41 is lowered on the lower molding portion 21, and gas is inserted into the parison P in the same manner as above. When the carriage 20 leaves the position A, the carriage 10 is moved to the position A, and the product completed in the molding device 30 is taken out by the automatic product takeout device 92.

The above procedure is repeated, whereby products are manufactured alternately in two molding devices. If the product design requires parts to be adhered on a parison portion opposing the groove 11a, the parts are put in the groove 11a by the part insert robot 91 after the finished product is taken out (FIG. 12). If the parts are to be adhered on another parison portion opposing the groove 31a, the parts may be put on the parison P after the parison P is accommodated in the groove 11a.

In the above embodiment, each of the robots 50, 90 and 91 is an articulated robot comprising a multiplicity of rotating mechanisms. However, each robot may be a polar coordinates robot comprising a multiplicity of rotating mechanisms and a sliding mechanism, a cylindrical coordinates robot comprising a rotating mechanism and a multiplicity of sliding mechanisms, or a rectangular coordinates robot comprising a multiplicity of sliding mechanisms.

In the above embodiment, the parison P is held at both the upper and lower ends thereof by the robots. However, another construction may be employed in which an end of the groove of the lower molding portion is positioned right below the extruding head and the parison P is held by a robot only at the upper end thereof and is accommodated in the groove. This construction does not require the lower end holding robot 90.

The parison P may be held at any appropriate point corresponding to the shape of the finished product instead of at an end thereof.

When a multiplicity of robots are provided, the parison P may be accommodated in the following way instead of being accommodated little by little from the end of the lower molding portion: the hands of the robots move in such a manner to shape the parison P substantially as the lower molding portion, thereafter quickly accommodating the parison P in the lower molding portion. When the apparatus has a construction in which the parison P is accommodated in the above way, heat of the parison P is restrained from flowing through the lower molding portion and also portion-by-portion difference in the temperature of the parison P is limited.

Although the two lower molding portions are provided in the above embodiment, one lower molding portion or more than two lower molding portions may be provided.

Although the lower molding portions are moved straight in the above embodiment, they may be placed on a rotating disc plate such as a dividing table.

Although the present invention has been fully described by way of an embodiment with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for manufacturing a hollow synthetic resin product, comprising:
   a lower molding portion having a top surface with a groove located therein,
   an upper molding portion having a bottom surface with a groove located therein, said upper and lower molding portions forming a mold when put together,
   means for inserting a parison into said groove of said lower molding portion, and
   means for inserting gas for inflating the parison after the parison is enclosed in said mold,
   said means for inserting a parison comprising:
   a cutter for cutting a parison extruded from an extruding head into a specified length;
   a robot having a hand for holding the parison at one point of the parison; and
   control means for moving the hand along the groove of said lower molding portion in such a manner that the parison held by the hand be accommodated in the groove.

2. An apparatus of claim 1, wherein said robot is an articulated robot having a multiplicity of rotating mechanisms.

3. An apparatus of claim 1, wherein said robot is a polar coordinates robot having a multiplicity of rotating mechanisms and a sliding mechanism.

4. An apparatus of claim 1, wherein said robot is a cylindrical coordinates robot having a rotating mechanism and a multiplicity of sliding mechanisms.

5. An apparatus of claim 1, wherein said robot is a rectangular coordinates robot having a multiplicity of sliding mechanisms.

6. An apparatus of claim 1, wherein the point held by the hand is an end of the parison.

7. An apparatus of claim 1, wherein the hand is controlled to hold an upper end of the parison and the lower molding portion is provided in such a place that an end of the groove is substantially right below the extruding head.

8. An apparatus of claim 1, further comprising another robot having a hand for holding the parison at another point of the parison 9. An apparatus of claim 8, wherein the hands of the robots are controlled to respectively hold both ends of the parison.

10. An apparatus of claim 1, wherein said robot is controlled to operate the hand to rotate a parison portion held by the hand around a twisting axis of the parison.

11. An apparatus of claim 1, further comprising at least one additional mold having an additional upper molding portion and an additional lower molding portion, wherein each of the lower molding portions are alternatively positioned below the extruding head.

12. An apparatus of claim 11, wherein the lower molding portions are provided on a dividing table and controlled to alternately move below the extruding head.

13. An apparatus for manufacturing a hollow synthetic resin product by inflating a parison extruded from an extruding head, said apparatus comprising:
   a first mold formed of a first upper molding portion and a first lower molding portion and a second mold formed of a second upper molding portion and a second lower molding portion, the first and second upper molding portions respectively being provided at first and second molding positions and the first and second lower molding portions respectively moving between a place below an extruding head and the molding positions;
   a cutter for cutting a parison extruded from the extruding head into a specified length;
   a robot having a hand for holding the parison at one point of the parison; and
   first control means for moving the hand along a first groove made in the first lower molding portion in such a manner that the parison held by the hand be accommodated in the first groove when the first lower molding portion is below the extruding head, and for moving the hand along a second groove made in the second lower molding portion when the second lower molding portion is below the extruding head; and
   second control means for controlling the first lower molding portion accommodating the parison to move to the first molding position and for controlling a nozzle inserting device to inflate the parison in cooperation with the first upper molding portion as well as for controlling the second lower molding portion to move from the second molding position to below the extruding head, and to move the second lower molding portion back to the second molding position and the first lower molding portion to below the extruding head.

14. An apparatus of claim 13, wherein the point held by the hand is an end of the parison.

15. An apparatus of claim 13, further comprising another robot having a hand for holding the parison at another point of the parison.

* * * * *